US012255384B1

(12) United States Patent
Prasannakumar et al.

(10) Patent No.: US 12,255,384 B1
(45) Date of Patent: Mar. 18, 2025

(54) EMBEDDED ANTENNAS IN MOBILE ELECTRONIC DEVICES

(71) Applicant: Meta Platforms Technologies, LLC, Menlo Park, CA (US)

(72) Inventors: Prathap Valale Prasannakumar, Sunnyvale, CA (US); Umar Azad, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 185 days.

(21) Appl. No.: 18/182,930

(22) Filed: Mar. 13, 2023

(51) Int. Cl.
*H01Q 1/27* (2006.01)
*H01Q 7/00* (2006.01)
*H01Q 9/04* (2006.01)

(52) U.S. Cl.
CPC ............... *H01Q 1/276* (2013.01); *H01Q 7/00* (2013.01); *H01Q 9/0414* (2013.01)

(58) Field of Classification Search
CPC .......... H01Q 1/27; H01Q 1/273; H01Q 1/276; H01Q 7/00; H01Q 9/0414
See application file for complete search history.

(56) References Cited

U.S. PATENT DOCUMENTS

2022/0084294 A1* 3/2022 Chen .................. G02B 27/0172

FOREIGN PATENT DOCUMENTS

CN 206311844 U * 7/2017 ............. G02B 27/01

* cited by examiner

*Primary Examiner* — Hoang V Nguyen
(74) *Attorney, Agent, or Firm* — Greenberg Traurig, LLP

(57) ABSTRACT

The disclosed system may include a sensor mounting bracket that has various mounting points for different sensors. The sensor mounting bracket may include a center portion and multiple different branches extending from the center portion. The system may also include a printed circuit board that includes antenna feed components. At least one of the branches of the sensor mounting bracket may be modified to form a specific type of antenna. The antenna feed components may be electrically connected to the antenna. Various other mobile electronic devices, apparatuses, and virtual reality headsets are also disclosed.

20 Claims, 9 Drawing Sheets

EMBEDDED ANTENNAS IN MOBILE ELECTRONIC DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
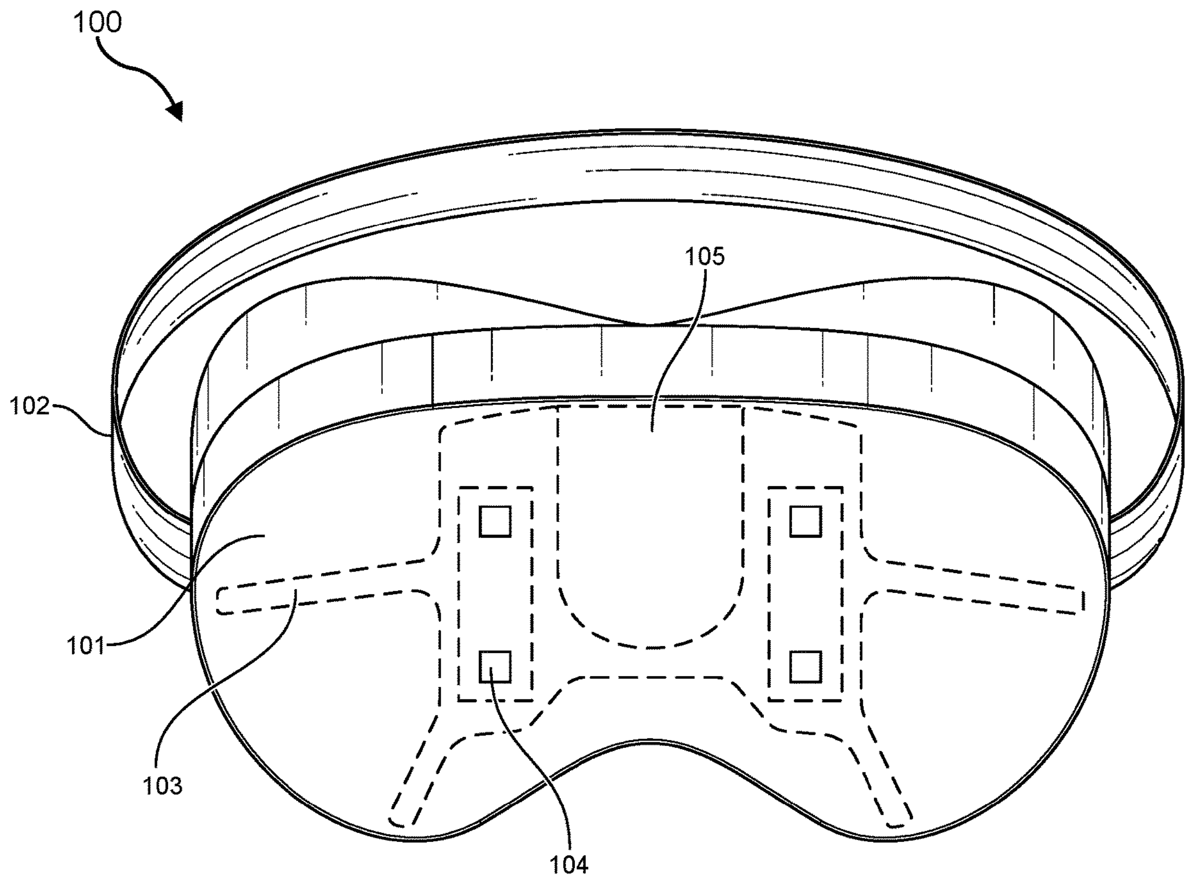
FIG. 1 illustrates a sensor mounting bracket within a virtual reality (VR) head mounted display (HMD).

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Virtual reality, augmented reality, and other electronic devices typically employ multiple different antennas to communicate with the outside world. These antennas may include cellular, Wifi, Bluetooth, global positioning system (GPS), near field communication (NFC), or other antennas. Over time, the mobile electronic devices housing these antennas have gotten increasingly smaller. These smaller form factors leave less room to house the various antennas needed for outside communication. Moreover, many inner electronic components of the mobile devices may interfere with the different antennas. As such, viable positions or placements for each of the antennas within the mobile devices may be limited.

In at least some of the embodiments herein, antennas may be embedded into various portions of a mobile electronic device's frame. In some embodiments, a mobile device such as a virtual reality (VR) head mounted device (HMD) or augmented reality (AR) device, smartwatch, or other similar device may include a sensor mounting bracket. While many of the embodiments described herein are presented in reference to a VR HMD, it will be recognized that these embodiments may be implemented with substantially any type of mobile electronic device. The sensor mounting bracket may be made of a rigid or semi-rigid material that is configured to hold multiple different sensors in place. The sensor mounting bracket may be made of metal, plastic, glass, ceramic, or other rigid or semi-rigid material (or combination of materials). The sensor mounting bracket may include apertures that are designed to hold different sensors or different types of sensors in place. The sensors may include visible light (i.e., image) sensors, infrared light sensors, motion sensors, heat sensors, touch sensors, or other types of sensors.

In one embodiment, a VR HMD may have a sensor mounting bracket with a central portion and multiple structural arms that extend from the center out to the sides of the device. The center portion and/or the metallic arms may provide structural support and housings for different sensors such as cameras. The embodiments described herein may use these structural support arms as antennas. These antennas may include different types of antenna designs, including slot antennas, loop antennas, inverted-F or planar inverted-F antennas (PIFAs), or other types of antennas. By using existing components of the VR HMD or other mobile device, space may be freed up for other electronic or mechanical components. This, in turn, may allow for even smaller form factors to be used with these devices.

The present disclosure provides antenna designs that integrate multiple different antennas into a structural plate. Moreover, the present disclosure describes antenna designs that provide sufficient separation to the various radiating elements of the antennas to provide at least a minimum threshold amount of operational efficiency. Such efficiency may be achieved while still preserving the structural integrity of the supporting plate. Still further, the present disclosure provides antenna designs that encompass VR HMD/controller scenarios that implement two WiFi antennas at opposite sides (for multiple in multiple out (MIMO) operation), as well as a centered Bluetooth antenna for controller communication. These Bluetooth and WiFi antennas may be positioned orthogonally to each other to provide both spatial separation and different polarization. These and other embodiments will be described in further detail below with regard to FIGS. 1-9.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an embodiment of a VR HMD 100. As noted above, the VR HMD 100 could be substantially any type of electronic device. For simplicity's sake, however, most of the embodiments herein will be described with reference to a virtual reality HMD. The VR HMD 100 may include a display portion 101 and a head strap 102 that may be wrapped around a user's head to secure the VR HMD 100 to the user's face. The display portion 101 may have multiple mechanical and/or electrical elements and may have multiple layers of such elements.

For example, the display portion 101 may have an interior portion with a display panel. The display panel may be visible to the user of the HMD and may display images as directed by a controller. The display panel may be one of many different types of display, include a liquid crystal display (LCD), a light emitting diode (LED) display, an organic LED (OLED) display, a holographic display, or other type of display component or device that generates images visible to a user. The display portion 101 may also have an exterior layer that acts as a protective cover. This exterior portion may have apertures for sensors such as cameras. Still further, the display portion may have an intermediary layer between the display panel and the exterior layer. This intermediary layer may include a sensor mounting bracket 105.

The sensor mounting bracket 105 may include different portions or areas including a center portion and various branches that extend from the center portion. The branches 103 may extend from the center portion in substantially any direction and in substantially any number. The branches 103 may be formed at the same length or at different lengths, or at the same width or at different widths. In the embodiment shown in FIG. 1, the sensor bracket 105 may include four branches, although different embodiments may include different numbers or placements of branches. The sensor bracket 105 may include apertures 104 for different sensors. The apertures 104 may be formed in different shapes and sizes to accommodate different sensors. In some embodiments, the sensors may be cameras, infrared sensors, motion sensors, heat sensors, or other types of sensors. The sensor bracket 105 may include substantially any number of apertures, each of which may be variably placed in different locations based on the needs and purposes of each electronic device.

Figure 2A:
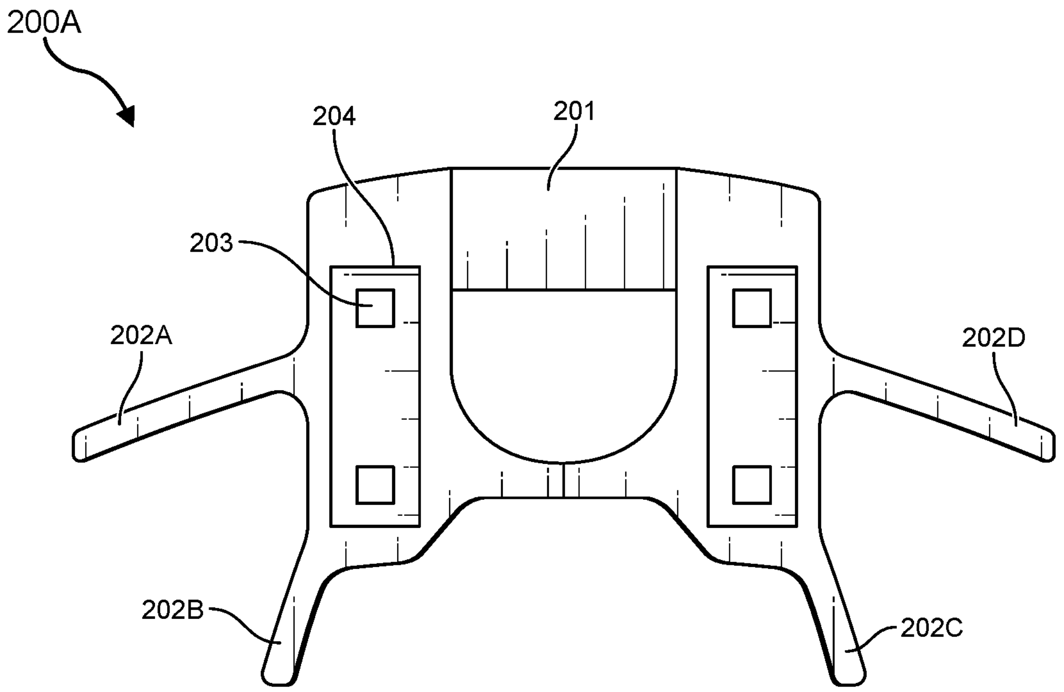
FIGS. 2A and 2B illustrate embodiments in which a sensor mounting bracket may be modified to form one or more antennas.

FIG. 2A illustrates an embodiment of a sensor mounting bracket 200A that includes one or more mounting points 204 for various sensors 203. As noted above, the sensor mounting bracket 200A may include substantially any number of mounting points 204 for substantially any number, size, or shape of sensors 203. The sensor mounting bracket 200A may include a center portion 201 and multiple different branches (e.g., 202A-202D) extending from the center portion. The center portion 201 may be formed in substantially any size or shape, and may be solid, or may include apertures in various locations. In some cases, the center portion 201 may be shaped to conform to the outlines of a VR HMD or other electronic device. The branches 202A-202D may likewise be formed in different shapes and sizes and may similarly conform to the outlines of the associated electronic device.

As will be explained further below, the branches may be modified to form different types of antennas. Each of these antennas may have an associated antenna feed. The antenna feed may include tuners, amplifiers, signal processors, impedance matching circuits, or other antenna feed components. Each of these components may be housed on a printed circuit board mounted within the mobile electronic device (e.g., a VR HMD). The antenna feed components on the printed circuit board may be electrically connected to the different types of antennas formed in the various branches 202A, 202B, 202C, and/or 202D.

Figure 2B:
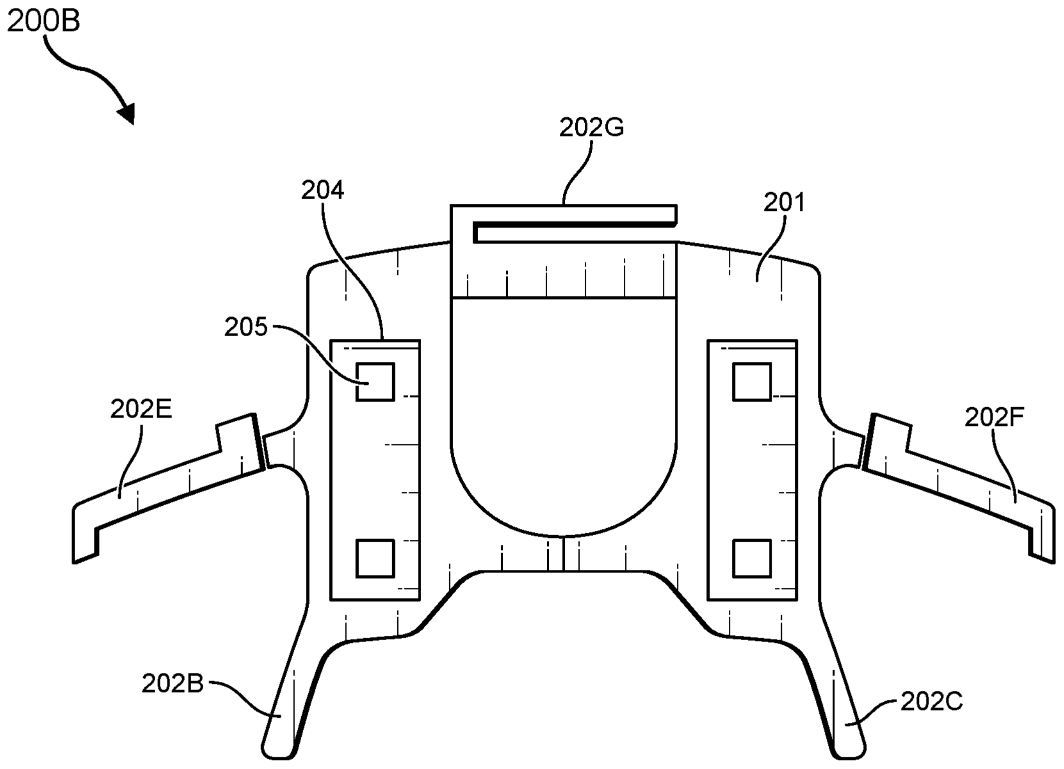

FIG. 2B illustrates an embodiment of a sensor mounting bracket 200B that includes different types of antennas. For example, the sensor mounting bracket 200B may include a planar inverted-F antenna (PIFA) in the top part of the center portion 201. If the sensor mounting bracket 200B is mounted upright as shown in FIG. 2B, the top part of the center portion 201 may be formed as a planar inverted-F antenna 202G with an L-shaped prong and a slot. The PIFA 202G may operate in various frequency bands and may be tuned using a tuner in the associated antenna feed.

At least in some cases, the PIFA 202G may be shaped and formed in a manner that functions as a radiating element. This radiating element may receive and transmit signals while, itself, being embedded in and part of the sensor mounting bracket 200B. The planar inverted-F antenna 202G may be grounded to one of the bottom branches (e.g., 202B and/or 202C) that protrude from the bottom part of the center portion 201 of the sensor mounting bracket. In some cases, for example, the PIFA 202G may be a Bluetooth antenna. The Bluetooth antenna may be configured to communicate with VR controllers or other mobile electronic devices. The Bluetooth antenna may be placed orthogonal to the left- and right-side antennas (e.g., Wi-Fi 2.4 GHz antennas) to achieve relatively high isolation via polarization diversity. Indeed, the placement of PIFA antenna 202G above and orthogonal to the left- and right-side antennas 202E/202F may allow the PIFA antenna 202G to operate at a different polarization than the antennas 202E/202F. This, in turn, may provide greater isolation and higher efficiency for each of the antennas 202E, 202F, and 202G.

The sensor mounting bracket 200A of FIG. 2A may also include left-side branches and right-side branches (e.g., 202A and 202D). These branches may be modified, as shown in FIG. 2B, to form planar inverted-F antennas 202E and 202F, respectively. As with the PIFA 202G, each of the PIFAs 202E and 202F may be grounded to either or both of the bottom branches 202B and 202C or to another part of the center portion 201 of the sensor mounting bracket 200B. In some cases, the PIFAs 202E and 202F may be WiFi antennas configured to communicate with surrounding mobile electronic devices. These two WiFi antennas may operate in multiple in multiple out (MIMO) fashion. The WiFi antennas may be spatially separated by at least a minimum distance. This minimum distance may ensure that the WiFi antennas can operate with little to no interference with each other and may operate at high efficiency in the MIMO fashion.

In some cases, at least some amount of separation may exist between the antennas (e.g., 202E or 202F) and the center portion of the sensor mounting bracket 200A. In such cases, carbon fiber or other non-conductive materials may be used to fill this gap and thereby link the main body of the sensor bracket (including one or more of the sensors 205) to the branches. This may allow for some amount of separation between the branches and the sensor mounting plate while still providing sufficient structural support for the sensors.

Here, it will be recognized that, while PIFA antennas are described and shown in FIGS. 2A and 2B, the branches 202A-202D and/or the center portion 201 of the sensor bracket may be modified to form substantially any type of antenna, including monopole, dipole, slot, loop, or other type of antenna. Moreover, while Bluetooth and WiFi antennas are specifically identified in the examples herein, it will be recognized that these antennas may operate in cellular bands, GPS bands, NFC bands, or in other frequency bands, and may be tuned for operation within a desired frequency range.

Figure 3A:
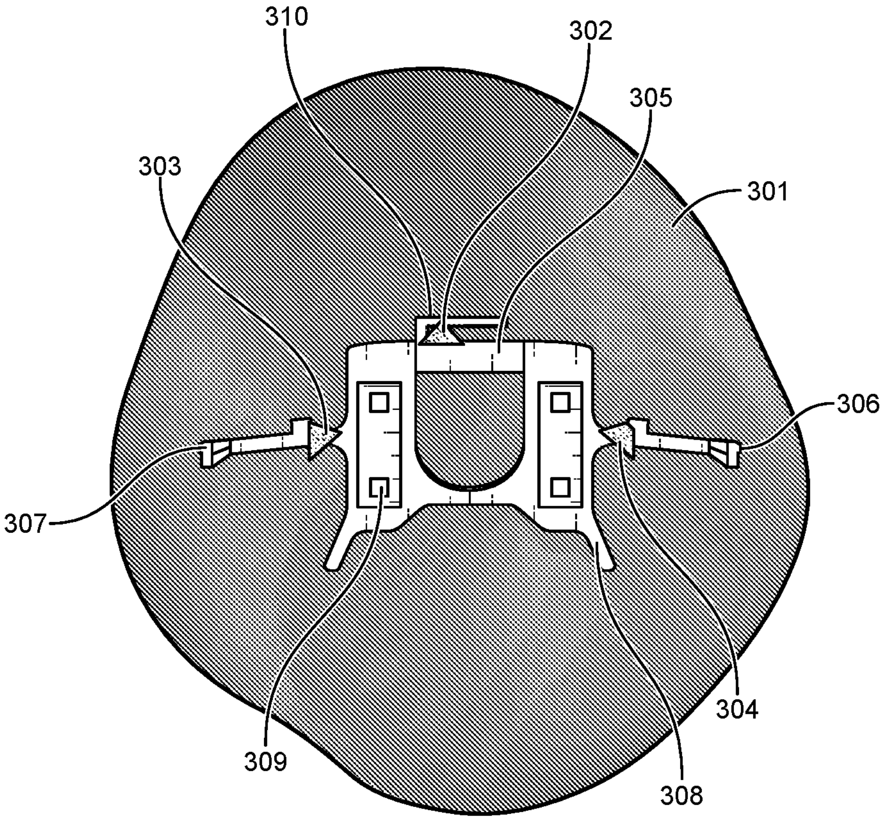
FIGS. 3A and 3B illustrate radiation patterns and antenna efficiency measurements for an example embodiment of a sensor mounting bracket.
Figure 3B:
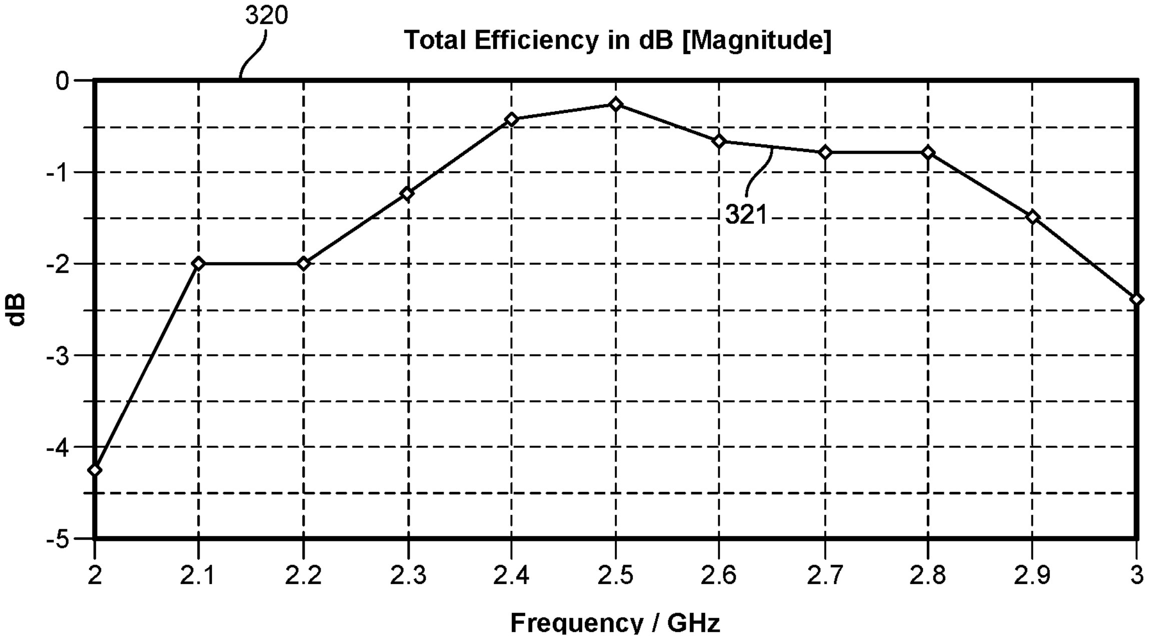

FIG. 3A illustrates a simulated radiation pattern for the top antenna 310 of the antennas generally shown in FIG. 2B. The radiation pattern 301 illustrates radiation from the topmost antenna of the sensor mounting bracket 305. The sensor mounting bracket 305 may include apertures for various sensors 309. The sensor mounting bracket 305 may also include antenna feeds 302, 303, and 304, each of which may be electrically connected to a corresponding antenna.

These antennas (e.g., 306, 307, 310, or other antennas) may each be tuned to operate at a specific frequency or tuned to operate within a specific frequency band. At least in some cases, the antennas may be grounded to one of the other branches (e.g., 308).

As can be seen in FIG. 3A, the antennas 307 and/or 308 may be formed in three dimensions, each having an end portion that extends upward from the surface of the sensor mounting bracket 305. Each of these antennas may provide omnidirectional radiation patterns that provide even coverage for communicating with surrounding devices. The radiation pattern 301 may correspond specifically to the planar inverted-F antenna 310 that is embedded within and is part of the top portion of the sensor mounting bracket 305. The radiation patterns of the other two antennas of FIG. 3A are shown further below with regard to FIGS. 4A and 5A. The efficiency of the antenna 310 may be shown in chart 320 of FIG. 3B, in which the total efficiency (in dB) is illustrated over a span of frequencies from 2-3 GHz in plot line 321. As can be seen, relatively high efficiency transmission and reception may advantageously occur at or near 2.4 GHz.

Figure 4A:
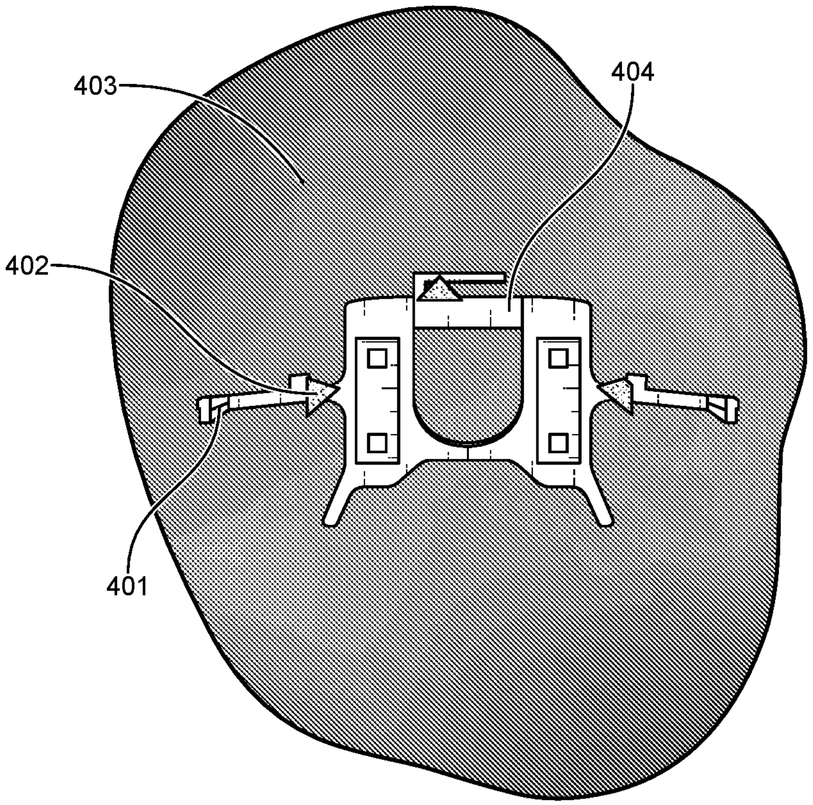
FIGS. 4A and 4B illustrate radiation patterns and antenna efficiency measurements for an alternative example embodiment of a sensor mounting bracket.
Figure 4B:
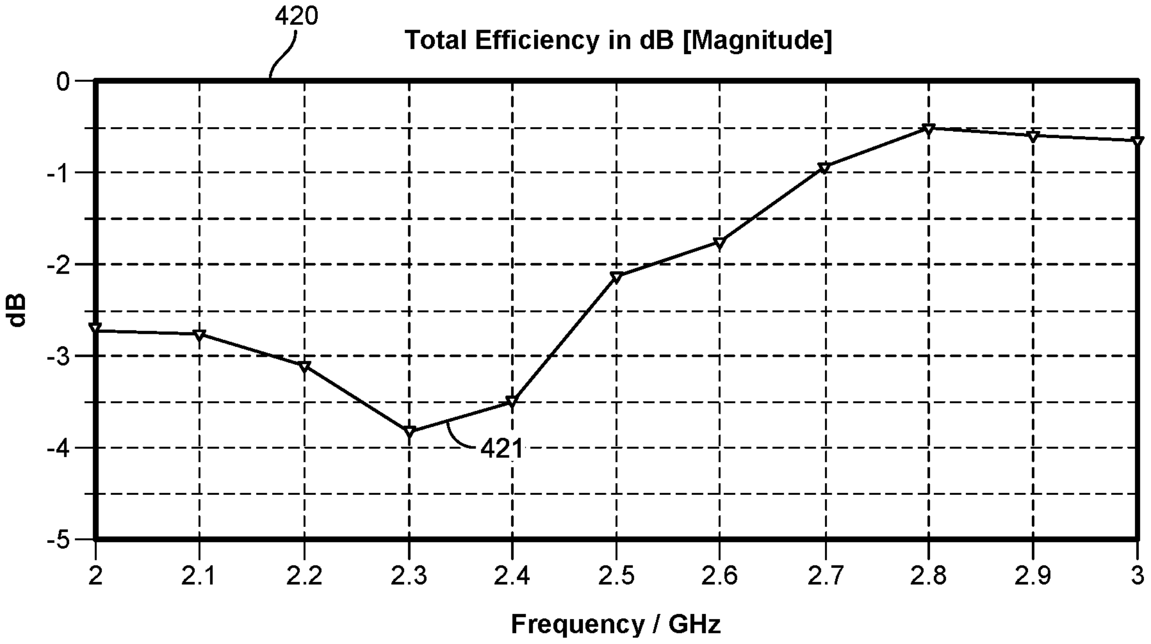

Similarly, in FIG. 4A, the radiation pattern 403 of the left-most antenna 401 is shown. This radiation pattern 403 is similarly omnidirectional relative to the location of the antenna 401. The antenna 401 may be fed by antenna feed 402, which itself may be electrically connected to a printed circuit board of the underlying mobile electronic device. The printed circuit board may be affixed to the sensor mounting bracket 404 or to another structural component. The total efficiency of this antenna 401 may be reflected in graph 420 of FIG. 4B. As can be seen in plot line 421, this antenna 401 may be most efficient between approximately 2.7-3 GHz.

Figure 5A:
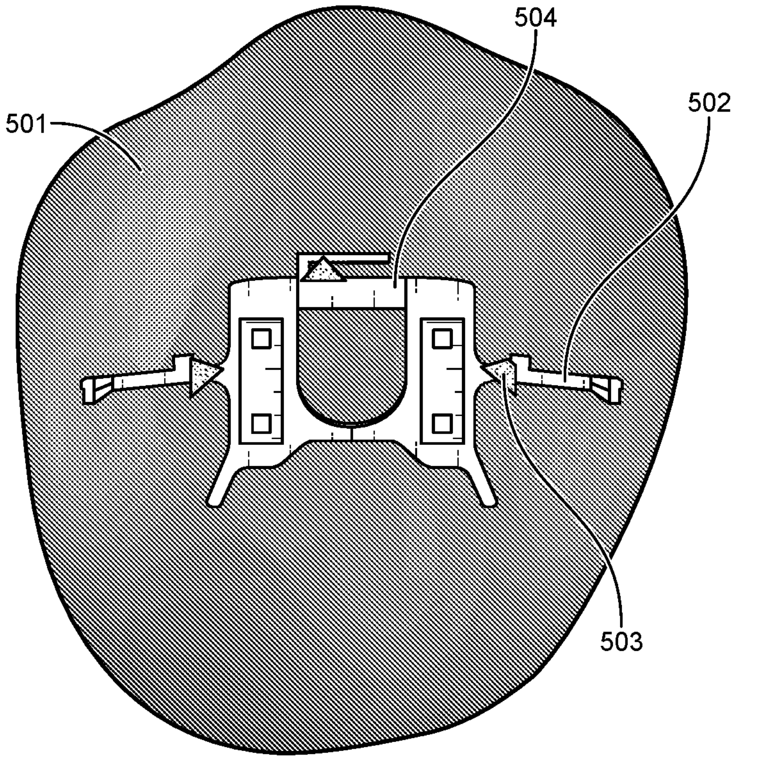
FIGS. 5A-5C illustrate radiation patterns, antenna efficiency measurements, and S-parameter measurements for an alternative example embodiment of a sensor mounting bracket.
Figure 5B:
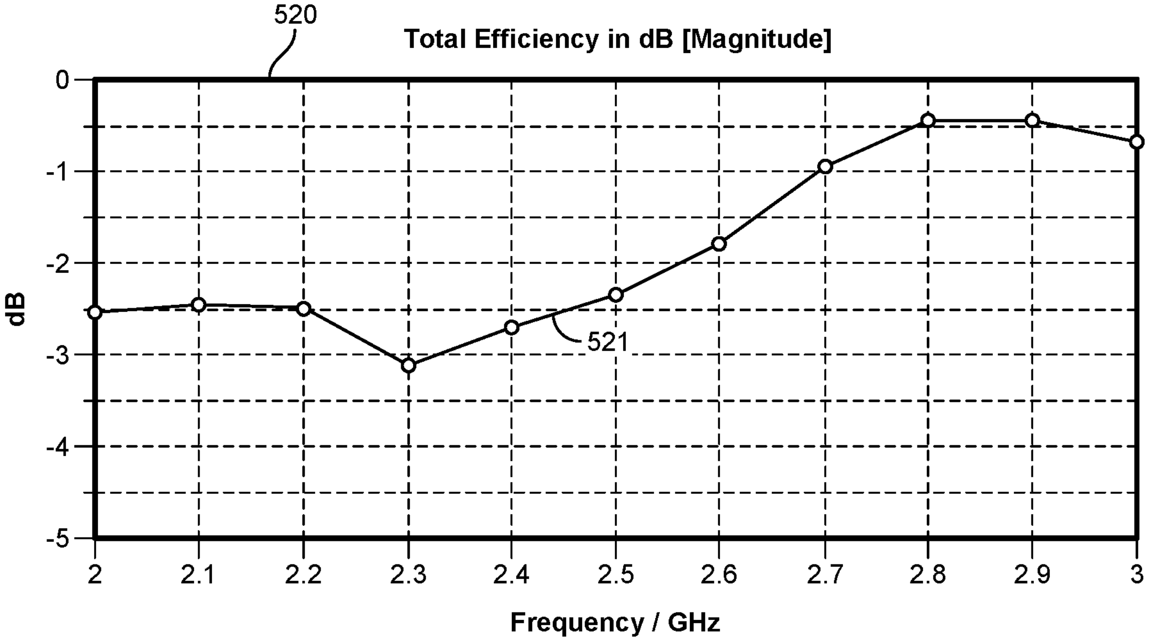
Figure 5C:
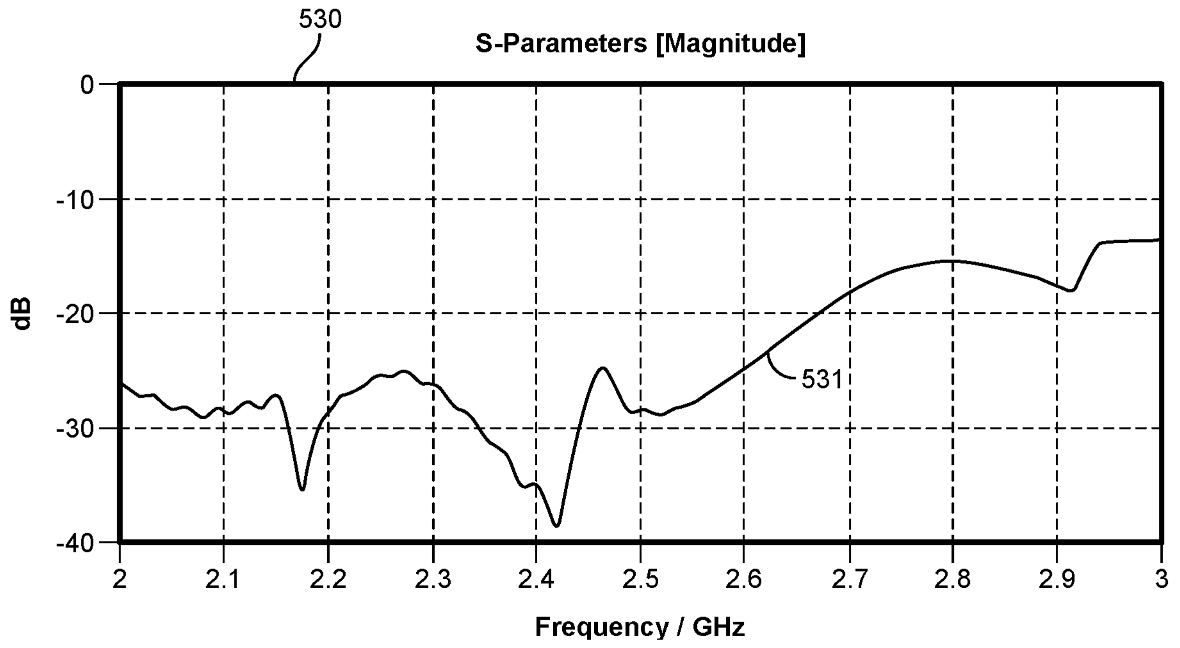

Still further, as shown in FIG. 5A, the radiation pattern 501 for the right-most antenna 502 may be relatively omnidirectional in relation to the location of antenna 502. The antenna 502 may be fed by antenna feed 503. The antenna feed 503 may be electrically connected to a printed circuit board, control board, or other controller. The antenna 502 may be embedded within and may be formed from existing portions of the sensor bracket 504. In some cases, portions of the sensor bracket 504 may be removed to create a certain type of antenna (e.g., a slot or PIFA antenna). In other cases, material may be added to the sensor bracket 504 to create monopole, dipole, or other types of antennas. The cutouts or additions may be placed anywhere on the sensor mounting bracket 504 of the mobile device. The total efficiency of the antenna 502 may be shown in chart 520 of FIG. 5B. Plot line 521 illustrates a higher overall antenna efficiency between 2.7-3 GHz, while plot line 531 of chart 530 in FIG. 5C illustrates advantageous S-parameter measurements at approximately 2.2 GHz and 2.4 GHz.

Figure 6:
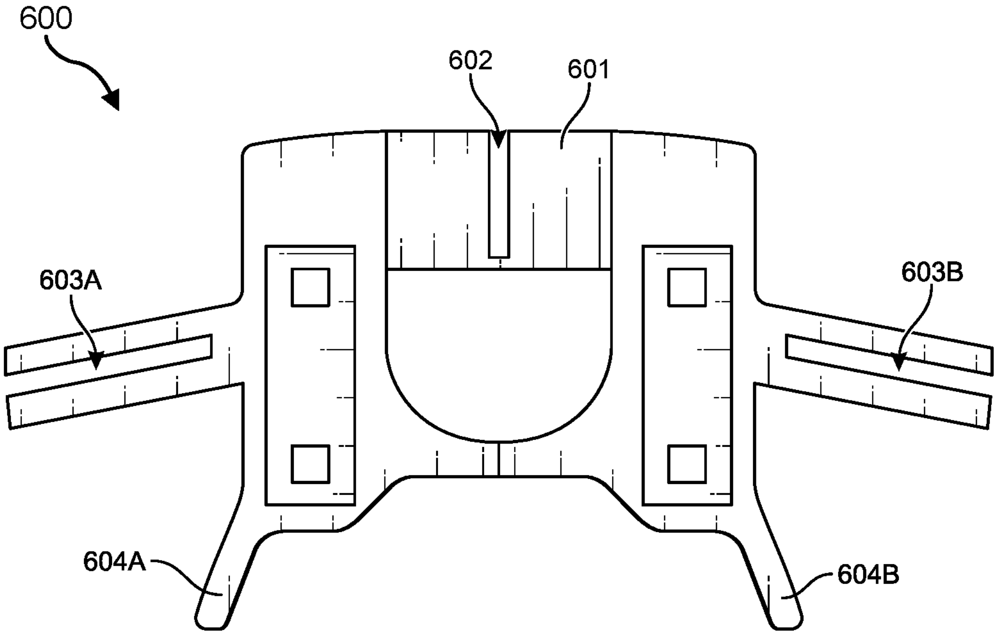
FIG. 6 illustrates an embodiment in which a sensor mounting bracket may be modified to form one or more alternative antennas.

FIG. 6 illustrates an alternative embodiment 600 in which a sensor mounting bracket 601 may be modified to include a slot antenna 602. The top portion of the sensor mounting bracket 601 may have various portions removed to include a slot that allows the top portion of the sensor mounting bracket 601 to function as a slot antenna. The slot antenna 602 may be driven by an antenna feed that is connected to a PCB of the mobile device. Additionally or alternatively, the left-side branch may be modified to form a slot antenna 603A, and the right-side branch may be modified to form a slot antenna 603B. Any or all of these antennas may be tuned for operation within a specific frequency range, and may be used as Bluetooth, WiFi, GPS, cellular, or other types of antennas. Other branches, including 604A and/or 604B may also be used as antennas, and may be formed into slot, PIFA, loop, or other antennas.

Figure 7:
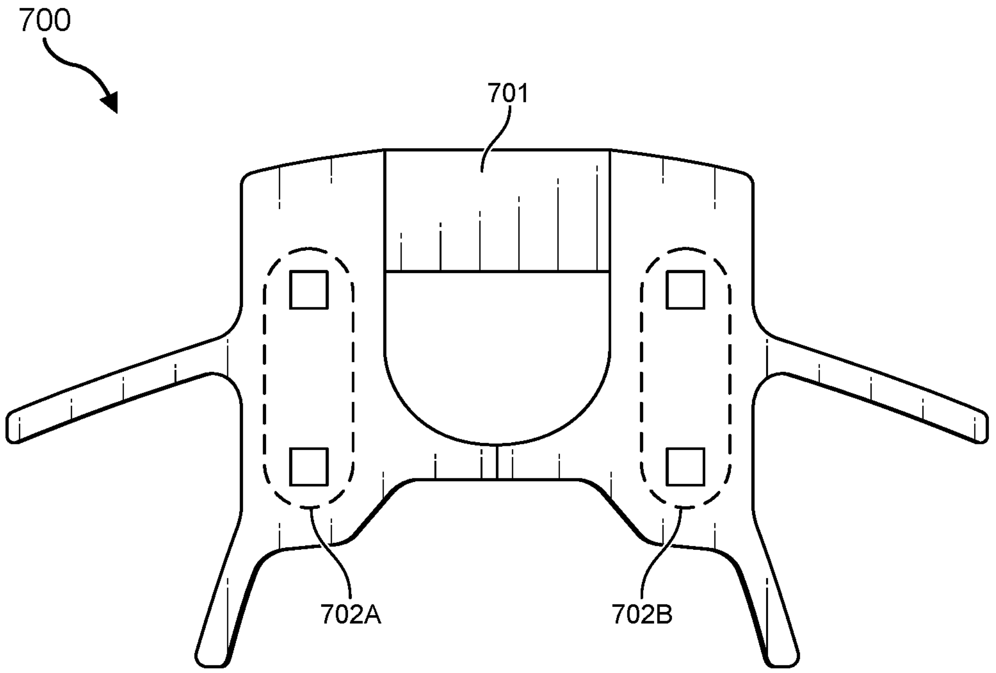
FIG. 7 illustrates an embodiment in which a sensor mounting bracket may be modified to form one or more alternative antennas.

FIG. 7 illustrates an alternative embodiment 700 in which a sensor mounting bracket 701 may be modified to include one or more loop antennas (e.g., 702A and 702B). In this embodiment, the top portion of the sensor mounting bracket 701 may have various portions removed to include a PIFA or slot antenna, as generally described above. The PIFA antenna may be driven by an antenna feed that is connected to a PCB of the mobile device. The left-side and/or right-side branches may be modified to include loop antennas 702A/702B. The loops may extend around an array of sensors as generally shown in FIG. 7 or may encompass different portions of the sensor mounting bracket 701. Each of these loop antennas 702A/702B may be tuned for operation within a specific frequency range and, as above, may be used as Bluetooth, WiFi, GPS, cellular, or other types of antennas.

At least in some embodiments, one or more of the various branches may function as ground for the loop antennas 702A/702B. In this manner, existing sensor mounting bracket components or elements may be modified or changed to function as radiating elements and may be tuned to operate in specific frequency ranges or as specific types of antennas. By placing the antennas relatively far apart on the sensor mounting bracket, the systems herein may provide sufficient spatial diversity for the antennas to operate with little to no interference. As such, the antennas may operate more efficiently, using less power while still transmitting and receiving at expected or higher transmission rates.

In addition to the system described above, a mobile electronic device may be provided which includes a sensor mounting bracket that includes one or more mounting points for various sensors. The sensor mounting bracket may include a center portion and multiple different branches extending from that center portion. The sensor mounting bracket may also include a printed circuit board that has one or more antenna feed components. At least one of the branches of the sensor mounting bracket may be modified to form a specific type of antenna, where the antenna feed components are electrically connected to the antenna.

Still further, a virtual reality headset may be provided that includes a sensor mounting bracket that includes a sensor mounting bracket that includes one or more mounting points for various sensors. The sensor mounting bracket may include a center portion and multiple different branches extending from that center portion. The sensor mounting bracket may also include a printed circuit board that has one or more antenna feed components. At least one of the branches of the sensor mounting bracket may be modified to form a specific type of antenna, where the antenna feed components are electrically connected to the antenna.

EXAMPLE EMBODIMENTS

Example 1: A system comprising: a sensor mounting bracket that includes one or more mounting points for a plurality of sensors, the sensor mounting bracket including a center portion and a plurality of different branches extending from the center portion, and a printed circuit board that includes one or more antenna feed components, wherein at least one of the branches of the sensor mounting bracket is modified to form a specific type of antenna, and wherein the antenna feed components are electrically connected to the antenna.

Example 2: The system of Example 1, wherein a top branch that comprises a top portion of the center portion of the sensor mounting bracket comprises a planar inverted-F antenna.

Example 3: The system of Example 1 or Example 2, wherein the planar inverted-F antenna is grounded to a bottom branch that comprises a bottom portion of the center portion of the sensor mounting bracket.

Example 4: The system of any of Examples 1-3, wherein the planar inverted-F antenna comprises a Bluetooth antenna.

Example 5: The system of any of Examples 1-4, wherein a left-side branch of the plurality of branches is modified to form a planar inverted-F antenna.

Example 6: The system of any of Examples 1-5, wherein a right-side branch of the plurality of branches is modified to form a planar inverted-F antenna.

Example 7: The system of any of Examples 1-6, wherein the left-side and right-side branches are grounded to a bottom branch that comprises a bottom portion of the center portion of the sensor mounting bracket.

Example 8: The system of any of Examples 1-7, wherein the left-side branch and the right-side branch comprise WiFi antennas.

Example 9: The system of any of Examples 1-8, wherein the left-side and right-side branches are tuned for operation within a specific frequency range.

Example 10: The system of any of Examples 1-9, wherein a top branch that comprises a top portion of the center portion of the sensor mounting bracket includes a slot antenna.

Example 11: The system of any of Examples 1-10, wherein a left-side branch of the plurality of branches is modified to form a slot antenna.

Example 12: The system of any of Examples 1-11, wherein a right-side branch of the plurality of branches is modified to form a slot antenna.

Example 13: The system of any of Examples 1-12, wherein the left-side and right-side branches are tuned for operation within a specific frequency range.

Example 14: A mobile electronic device comprising: a sensor mounting bracket that includes one or more mounting points for a plurality of sensors, the sensor mounting bracket including a center portion and a plurality of different branches extending from the center portion, and a printed circuit board that includes one or more antenna feed components, wherein at least one of the branches of the sensor mounting bracket is modified to form a specific type of antenna, and wherein the antenna feed components are electrically connected to the antenna.

Example 15: The mobile electronic device of Example 14, wherein a top branch that comprises a top portion of the center portion of the sensor mounting bracket comprises a planar inverted-F antenna.

Example 16: The mobile electronic device of Example 14 or Example 15, wherein a left-side portion of the center portion of the sensor mounting bracket is modified to form a loop antenna.

Example 17: The mobile electronic device of any of Examples 14-16, wherein a right-side portion of the center portion of the sensor mounting bracket is modified to form a loop antenna.

Example 18: The mobile electronic device of any of Examples 14-17, wherein the left-side and right-side loop antennas comprise WiFi antennas.

Example 19: The mobile electronic device of any of Examples 14-18, wherein the left-side and right-side loop antennas are tuned for operation within a specific frequency range.

Example 20: A virtual reality headset comprising: a sensor mounting bracket that includes one or more mounting points for a plurality of sensors, the sensor mounting bracket including a center portion and a plurality of different branches protruding from the center portion, and a printed circuit board that includes one or more antenna feed components, wherein at least one of the branches of the sensor mounting bracket is modified to form a specific type of antenna, and wherein the antenna feed components are electrically connected to the antenna.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
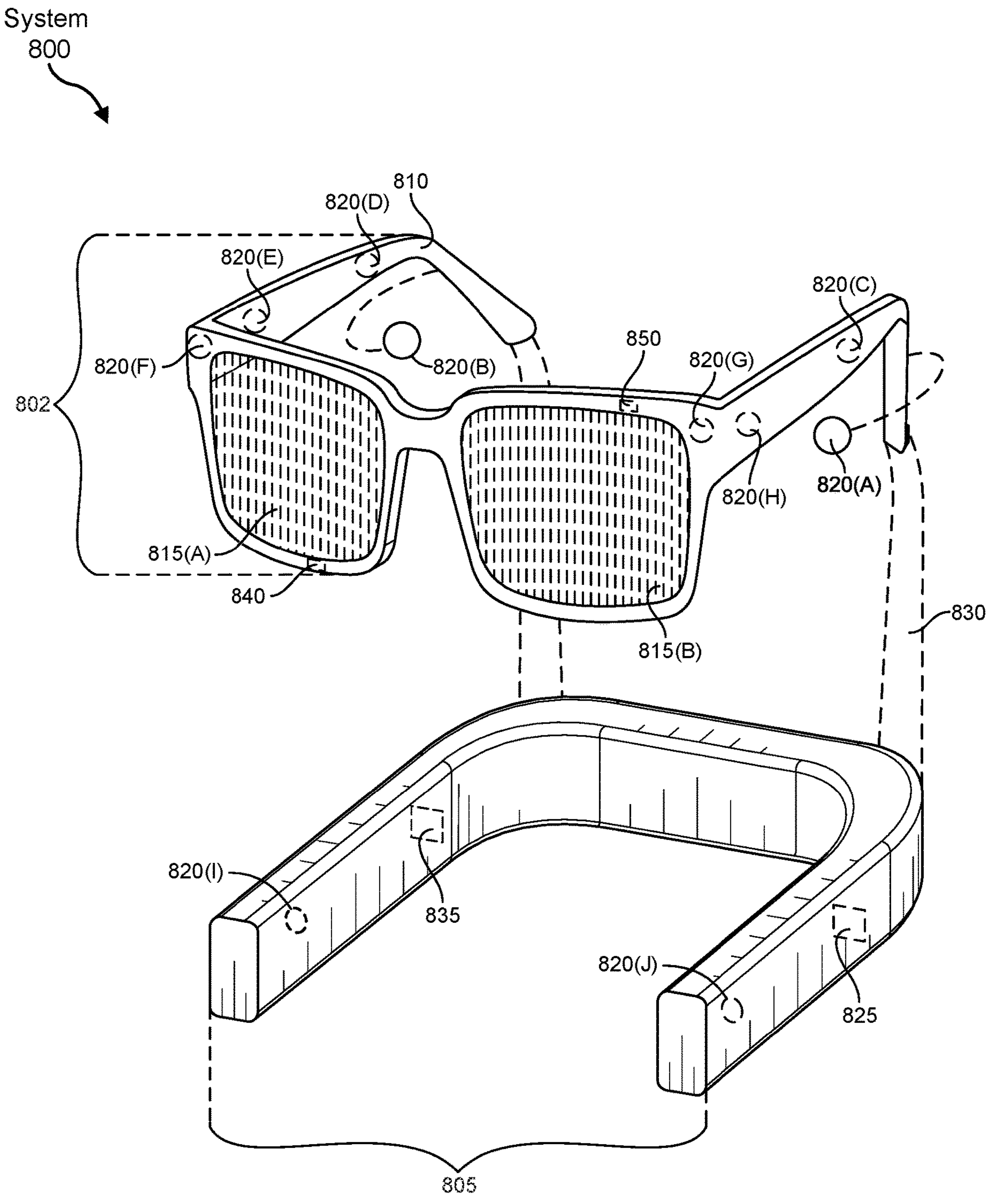
FIG. 8 is an illustration of exemplary augmented-reality glasses that may be used in connection with embodiments of this disclosure.
Figure 9:
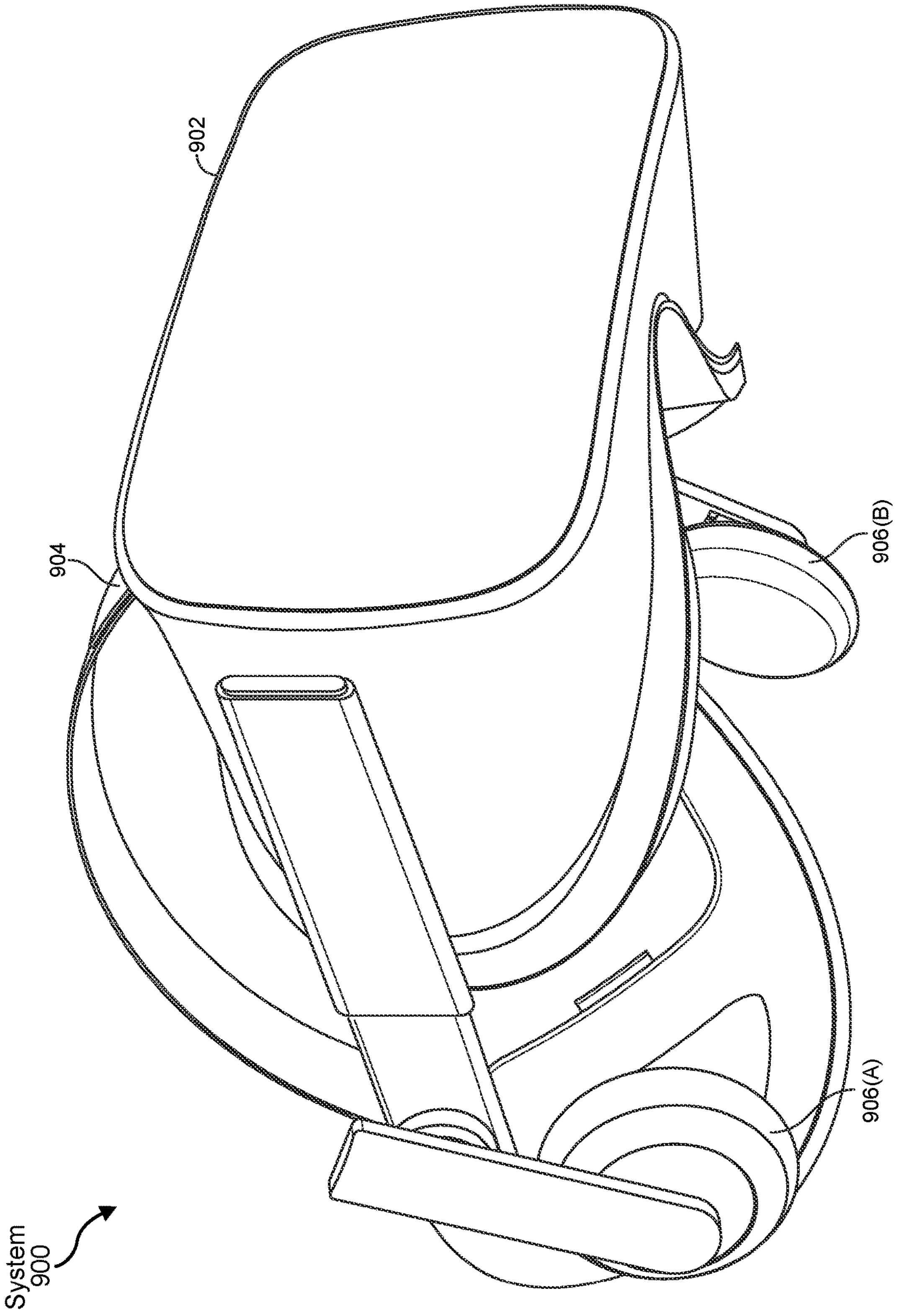
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality system 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium-ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
- a sensor mounting bracket that includes one or more mounting points for a plurality of sensors, the sensor mounting bracket including a center portion and a plurality of different branches extending from the center portion; and
- a printed circuit board that includes one or more antenna feed components,
- wherein at least one of the branches of the sensor mounting bracket is modified to form a specific type of antenna, and
- wherein the antenna feed components are electrically connected to the antenna.

2. The system of claim 1, wherein a top branch that comprises a top portion of the center portion of the sensor mounting bracket comprises a planar inverted-F antenna.

3. The system of claim 2, wherein the planar inverted-F antenna is grounded to a bottom branch that comprises a bottom portion of the center portion of the sensor mounting bracket.

4. The system of claim 2, wherein the planar inverted-F antenna comprises a Bluetooth antenna.

5. The system of claim 2, wherein a left-side branch of the plurality of branches is modified to form a planar inverted-F antenna.

6. The system of claim 5, wherein a right-side branch of the plurality of branches is modified to form a planar inverted-F antenna.

7. The system of claim 6, wherein the left-side and right-side branches are grounded to a bottom branch that comprises a bottom portion of the center portion of the sensor mounting bracket.

8. The system of claim 6, wherein the left-side branch and the right-side branch comprise WiFi antennas.

9. The system of claim 6, wherein the left-side and right-side branches are tuned for operation within a specific frequency range.

10. The system of claim 1, wherein a top branch that comprises a top portion of the center portion of the sensor mounting bracket includes a slot antenna.

11. The system of claim 10, wherein a left-side branch of the plurality of branches is modified to form a slot antenna.

12. The system of claim 11, wherein a right-side branch of the plurality of branches is modified to form a slot antenna.

13. The system of claim 12, wherein the left-side and right-side branches are tuned for operation within a specific frequency range.

14. A mobile electronic device comprising:
- a sensor mounting bracket that includes one or more mounting points for a plurality of sensors, the sensor mounting bracket including a center portion and a plurality of different branches extending from the center portion; and
- a printed circuit board that includes one or more antenna feed components,
- wherein at least one of the branches of the sensor mounting bracket is modified to form a specific type of antenna, and
- wherein the antenna feed components are electrically connected to the antenna.

15. The mobile electronic device of claim 14, wherein a top branch that comprises a top portion of the center portion of the sensor mounting bracket comprises a planar inverted-F antenna.

16. The mobile electronic device of claim 15, wherein a left-side portion of the center portion of the sensor mounting bracket is modified to form a loop antenna.

17. The mobile electronic device of claim 16, wherein a right-side portion of the center portion of the sensor mounting bracket is modified to form a loop antenna.

18. The mobile electronic device of claim 17, wherein the left-side and right-side loop antennas comprise WiFi antennas.

19. The mobile electronic device of claim 17, wherein the left-side and right-side loop antennas are tuned for operation within a specific frequency range.

20. A virtual reality headset comprising:
- a sensor mounting bracket that includes one or more mounting points for a plurality of sensors, the sensor mounting bracket including a center portion and a plurality of different branches extending from the center portion; and
- a printed circuit board that includes one or more antenna feed components,
- wherein at least one of the branches of the sensor mounting bracket is modified to form a specific type of antenna, and
- wherein the antenna feed components are electrically connected to the antenna.

* * * * *